(12) United States Patent
Williams et al.

(10) Patent No.: US 7,735,518 B2
(45) Date of Patent: Jun. 15, 2010

(54) VALVE ASSEMBLY WITH DUAL ACTUATION SOLENOIDS

(75) Inventors: Kevin C. Williams, Wixom, MI (US); Robert H. Neff, Bloomfield Village, MI (US)

(73) Assignee: Mac Valves, Inc., Wixom, MI (US)

( * ) Notice: Subject to any disclaimer, the term of this patent is extended or adjusted under 35 U.S.C. 154(b) by 832 days.

(21) Appl. No.: 11/649,939

(22) Filed: Jan. 5, 2007

(65) Prior Publication Data

US 2008/0163939 A1 Jul. 10, 2008

(51) Int. Cl.
*F15B 13/04* (2006.01)

(52) U.S. Cl. .......................... 137/625.63; 137/596.15; 251/29

(58) Field of Classification Search .................. 137/596.14–596.16, 596.18, 625.64, 625.63; 251/29, 26
See application file for complete search history.

(56) References Cited

U.S. PATENT DOCUMENTS

| | | | | | |
|---|---|---|---|---|---|
| 2,634,086 | A | * | 4/1953 | Johns | 137/625.64 |
| 2,966,890 | A | * | 1/1961 | Panissidi | 137/625.64 |
| 2,981,287 | A | * | 4/1961 | Caslow | 137/625.63 |
| 3,040,768 | A | * | 6/1962 | Pippenger | 137/625.64 |
| 3,126,031 | A | * | 3/1964 | Hayner | 137/625.63 |
| 3,450,160 | A | * | 6/1969 | Tess | 137/625.64 |
| 3,502,109 | A | * | 3/1970 | Straight | 137/625.64 |
| 3,804,120 | A | * | 4/1974 | Garnett | 137/625.64 |
| 4,023,593 | A | * | 5/1977 | Piccardo | 137/625.64 |
| 4,114,650 | A | * | 9/1978 | Gordon | 137/625.63 |
| 4,462,426 | A | * | 7/1984 | Rexer | 137/625.63 |
| 4,569,273 | A | * | 2/1986 | Anderson et al. | 137/625.63 |
| 4,646,785 | A | * | 3/1987 | Ruedle et al. | 137/625.64 |
| 4,960,365 | A | * | 10/1990 | Horiuchi | 137/625.64 |
| 5,251,535 | A | * | 10/1993 | Lacher et al. | 137/625.64 |
| 5,588,465 | A | * | 12/1996 | Witowski et al. | 137/625.64 |
| 5,640,987 | A | * | 6/1997 | Sturman | 137/625.65 |
| 5,954,030 | A | * | 9/1999 | Sturman et al. | 251/129.04 |
| 6,109,291 | A | * | 8/2000 | Yoshimura | 137/625.64 |
| 6,192,937 | B1 | * | 2/2001 | Fagerlie et al. | 137/625.63 |
| 6,739,293 | B2 | * | 5/2004 | Turner et al. | 137/625.64 |
| 7,093,544 | B1 | | 8/2006 | Allen et al. | |

* cited by examiner

*Primary Examiner*—Stephen Hepperle
*Assistant Examiner*—Craig Price
(74) *Attorney, Agent, or Firm*—Harness, Dickey & Pierce, P.L.C.

(57) ABSTRACT

A solenoid actuated valve assembly includes a valve body having a slidable main valve member and a pilot valve body mechanically connected to the valve body including a slidable pilot valve member. A first solenoid operated valve connected to the pilot valve body when energized directs pressurized fluid to move the pilot valve member between pilot valve open and closed positions. A second solenoid operated valve connected to the valve body when simultaneously energized with the first valve directs the fluid to move the main valve member between valve closed and open positions. A third solenoid operated valve connected to the pilot valve body when energized and when both the first and second solenoid operated valves are de-energized directs the fluid to move the pilot valve to the pilot valve open position and the main valve member to the valve closed position.

18 Claims, 6 Drawing Sheets

VALVE ASSEMBLY WITH DUAL ACTUATION SOLENOIDS

FIELD

The present disclosure relates to solenoid actuated valve assemblies used as pilot valves for actuating fluid control valves.

BACKGROUND

The statements in this section merely provide background information related to the present disclosure and may not constitute prior art.

Solenoid actuated valves are known which rely on a solenoid connected by a driving device to reposition a fluid valve member. An electrical current flow to the solenoid creates a magnetic field which displaces the driving device to reposition the valve member from a first to a second position. Removal of the electrical current can cause the driving device to stop in place. A biasing element such as a spring is therefore commonly provided with the valve member which biases the valve member and the driving device opposite to the magnetic field driving direction to automatically return the valve member and the driving device to the non-energized position. Solenoid actuated valves can be used for both normally open and normally closed valves defined when the solenoid is de-energized.

In place of a biasing element, valve assemblies using two oppositely positioned solenoid pilot valves which are individually energized to alternately position the main valve member in each of an open and a closed position are also known. One application of this type of valve is a directional control valve used in bulk material (such as coal) carrying railway cars. The pilot valves are separately energized to each of isolate and permit flow of a pneumatic fluid to control a main pneumatic valve which controls the dump door(s) of the railway car. In arrangements when air pressure can be always present at the main valve, acceleration forces due to car movement, coupling/de-coupling, etc. could cause a main valve to displace when the pilot valves are de-energized, resulting in an unintentional release of the bulk material. A magnet is therefore known in certain applications of these valves which holds the valve member of the main valve closed when the pilot valves are de-energized to prevent unintentional displacement. The magnet, however, is also susceptible to release under certain anticipated acceleration forces. A modified solenoid actuated valve is therefore desirable which eliminates the magnet and provides a positive force in place of the magnet to retain the valve in the closed position.

SUMMARY

According to several embodiments of a valve assembly with dual actuation solenoids of the present disclosure a solenoid actuated valve assembly includes a main valve body having a main valve member slidably disposed in the main valve body. A pilot valve body is in fluid communication with the main valve body. The pilot valve body has a pilot valve member slidably disposed in the pilot valve body. A first solenoid operated valve operates when energized to permit a pressurized fluid to move the pilot valve member from a pilot valve closed to a pilot valve open position. A second solenoid operated valve operates when simultaneously energized with the first solenoid operated valve to allow the fluid to move the main valve member from a valve closed to a valve open position.

According to additional embodiments, a third solenoid operated valve is connected to the pilot valve body. The third solenoid operated valve operates when energized and when both the first and second solenoid operated valves are de-energized to permit the pressurized fluid to move the pilot valve to the pilot valve closed position and the main valve member to the valve closed position.

According to still further embodiments, a method is provided for operating a solenoid actuated valve assembly including a main valve body having a main valve member slidably disposed in the valve body, a pilot valve body mechanically connected to and in fluid communication with the main valve body, and the pilot valve body having a pilot valve member slidably disposed in the pilot valve body. The method includes a step for energizing a first solenoid operated valve connected to the pilot valve body to direct a pressurized fluid to move the pilot valve member from a pilot valve closed to a pilot valve open position. The method also includes a step for simultaneously energizing with the first solenoid operated valve a second solenoid operated valve connected to the main valve body to direct the pressurized fluid to move the main valve member from a valve closed to a valve open position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
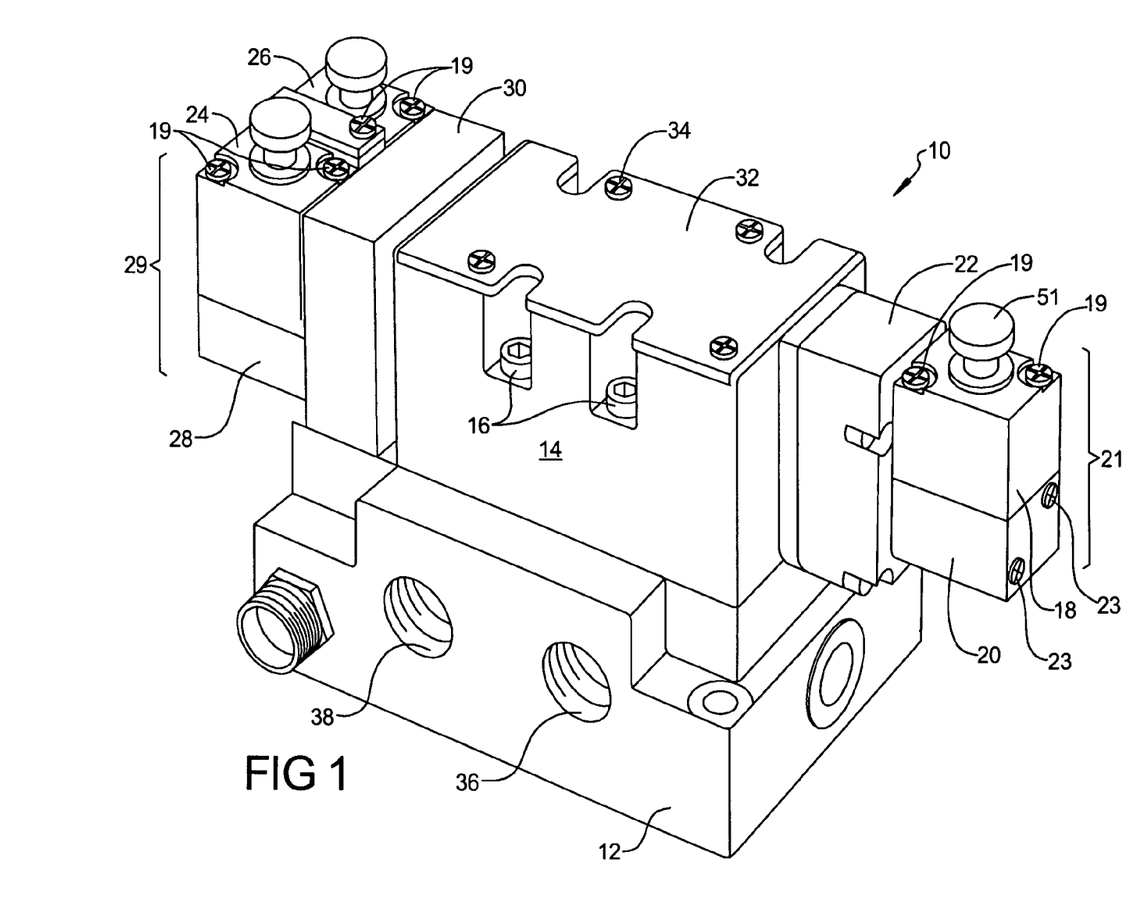
FIG. 1 is a front perspective view of a valve assembly with dual actuation solenoid operated pilot valves of the present disclosure which are simultaneously energized to reposition a valve member to permit pneumatic fluid flow.

According to several embodiments of the present disclosure and referring generally to FIG. 1, a valve assembly 10 includes a base 12 having a main valve body 14 connected to the base 12 using a plurality of fasteners 16. A first solenoid 18 can be connected using fasteners 19 to a first valve 20 which together define a first solenoid operated valve 21. First solenoid operated valve 21 can be mechanically connected to a first connecting member 22 for example using fasteners 23. First connecting member 22 can also be connected to main valve body 14.

Valve assembly 10 also includes a second solenoid 24 and a third solenoid 26. Second solenoid 24 can be connected for example using fasteners 19 to a second valve 28. Second solenoid 24 and second valve 28 together define a second solenoid operated valve 29. Second solenoid operated valve 29 is connected for example using a plurality of fasteners 23 (not shown in this view) to a second connecting member 30. Second connecting member 30 is in turn connected for example using fasteners (not shown in this view) to main valve body 14.

Valve assembly 10 can further include an access plate 32 fastened to main valve body 14 using a plurality of fasteners 34. Access plate 32 is removable to access electrical wiring associated with solenoids 18, 24, and 26. Base 12 further includes an air inlet port 36 and an air exhaust port 38. Air inlet port 36 can be connected to a source of pressurized air for subsequent control of a secondary valve not shown. Air exhaust port 38 is provided to return the air received by air inlet port 36 to the air source or to exhaust the air to atmosphere.

Figure 2:
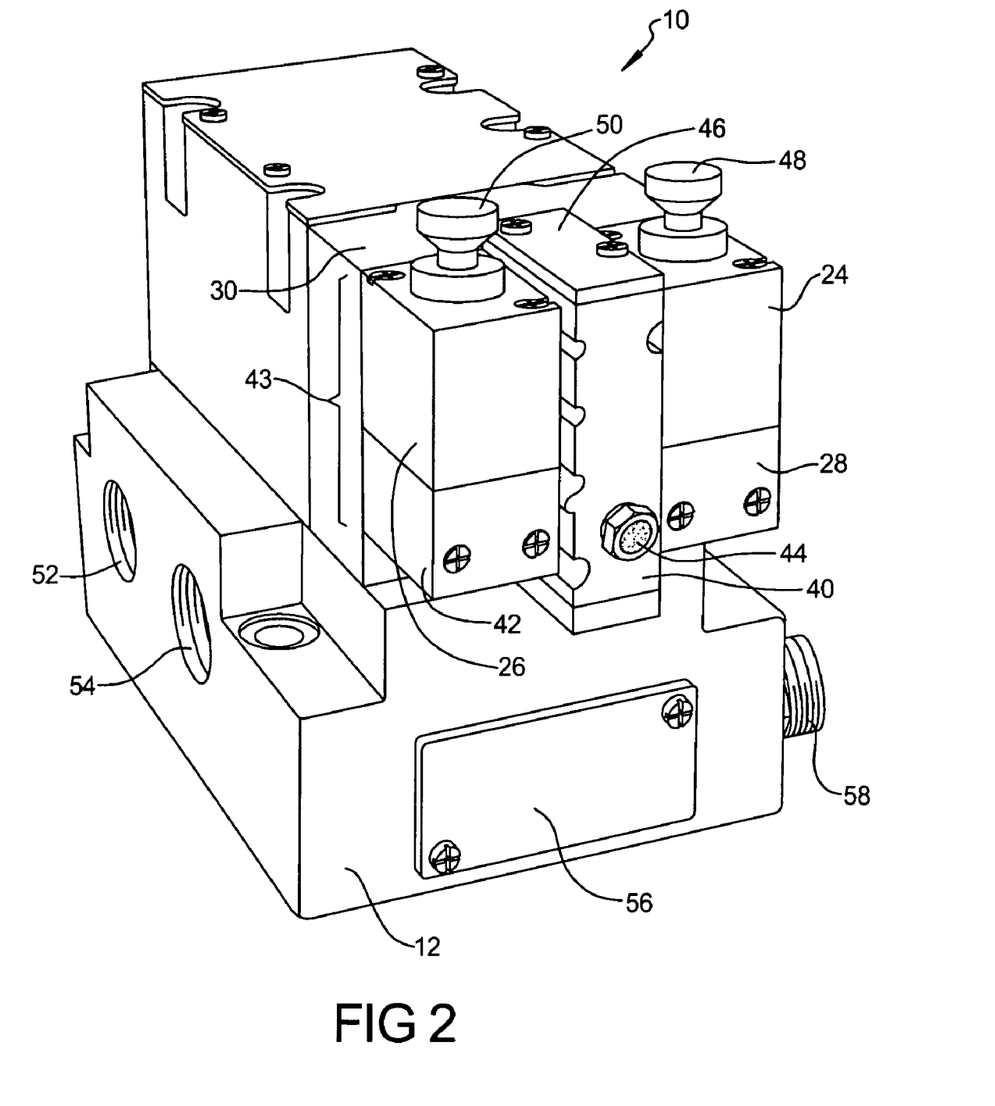
FIG. 2 is an end perspective view of the valve assembly of FIG. 1.

As best seen in reference to FIG. 2, valve assembly 10 further includes a pilot valve body 40 which is also connected to second connecting member 30 between first and second solenoids 24 and 26. A third valve 42 is shown connected to third solenoid 26 and together third solenoid 26 and third valve 42 define a third solenoid operated valve 43. Each of the second valve 28 and third valve 42 include internal flow passages which will be discussed in greater detail later herein which are in alignment with corresponding flow passages in each of pilot valve body 40 and second connecting member 30. A muffler 44 can also be provided at an air exhaust location of pilot valve body 40. One purpose of muffler 44 is to reduce the output noise as air exhausts from pilot valve body 40. A second access cover 46 is connected to pilot valve body 40 which allows access to the internal components of pilot valve body 40.

Each of the first, second, and third solenoids 18, 24, and 26 of the present disclosure and in particular as best seen in reference to FIG. 2, includes a manual actuation device which allows the solenoid to be manually operated when electrical power is lost to any one of the solenoids. First and second manual solenoid actuating members 48, 50 are connected to each of second and third solenoids 24, 26 respectively. A third manual solenoid actuating member 51 is best seen in reference to FIG. 1. Base 12 further includes each of a first and second cylinder port 52, 54 which are positioned on an opposite facing side of base 12 from air inlet port 36 and air exhaust port 38. First and second cylinder ports 52, 54 are provided to connect air discharged from valve assembly 10 to an actuator cylinder shown and described in reference to FIG. 6. Base 12 can further include a third access cover 56 which is removable to allow access to electrical wiring in the base 12. An electrical connector 58 also extends from base 12 which can be used for example to provide connection for a wiring harness and/or power cables directed into valve assembly 10.

Figure 3:
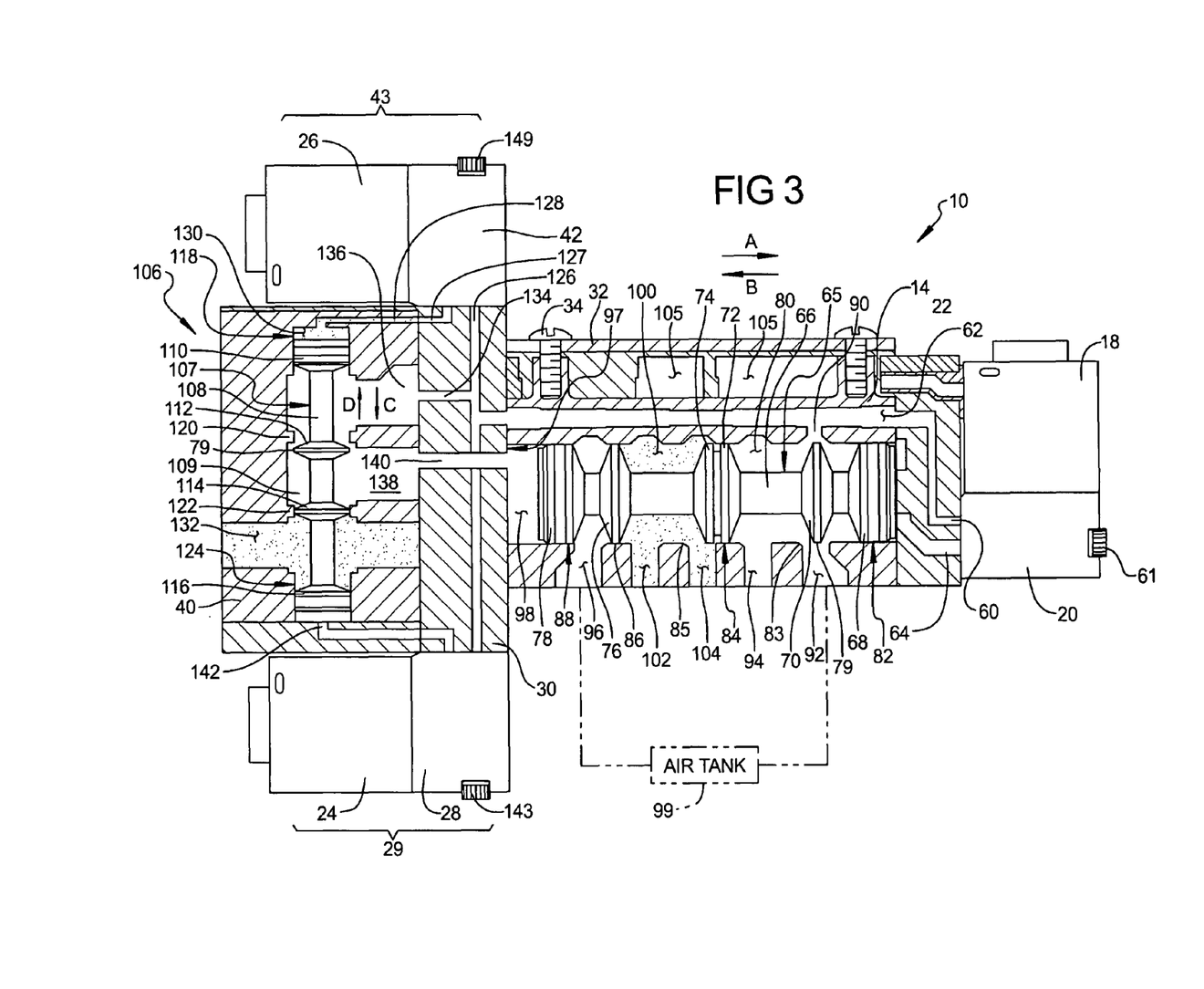
FIG. 3 is a partial cross-sectional view of a valve assembly with dual actuation solenoids of the present disclosure modified to shown exemplary internal components and flow paths, showing the valve assembly in a closed configuration.

Referring now generally to FIG. 3, the internal components and internal fluid flow passageway configurations of valve assembly 10 are shown, except for the internal geometry of base 12 which is omitted for clarity. To further clarify the internal geometry of the various fluid flow passageways of valve assembly 10, second solenoid operated valve 29 is oppositely positioned about pilot valve body 40 from third solenoid operated valve 43. A connecting passageway 60 is created in first connecting member 22 defining a flow passage between first valve 20 and a main fluid passageway 62 of main valve body 14. In several embodiments main fluid passageway 62 extends throughout a total length of main valve body 14 and is in fluid communication between each of first connecting member 22 and second connecting member 30. First connecting member 22 further includes a valve member flow passage 64 which is in fluid communication between first valve 20 and main valve body 14.

Main valve body 14 includes a slidably disposed main valve member 65. Main valve member 65 includes a main cylindrical shaft 66 having a first main piston 68 connected at a first end. In sequential order following first main piston 68 main cylindrical shaft 66 further includes each of a first, second, third, and fourth seal member 70, 72, 74, 76 each defining a disc that extends radially outward from main cylindrical shaft 66. A second main piston 78 is created at a second, opposite end of main cylindrical shaft 66 from first main piston 68. Each of the first, second, third, and fourth seal members 70, 72, 74, 76 have pre-determined positions between the first and second main pistons 68 and 78. Each of the seal members 70, 72, 74, 76 further include a resilient material seal 79 which is positioned at an outer radial perimeter of the seal member. The resilient material seals 79 are fixedly connected to each of the individual seal members and machined as necessary to define a seal face where the seal member can create a fluid seal.

Main valve member 65 is slidably disposed in a main valve chamber 80 created in main valve body 14. Main valve chamber 80 includes a first valve piston cylinder 82 which slidably receives first main piston 68. A substantially circular first valve seat ring 83 extends radially inward into main valve chamber 80 and can be contacted by the resilient material seal 79 of first seal member 70. A second valve seat ring 84 similar to first valve seat ring 83 is also provided within main valve chamber 80 and is adapted to sealingly receive second seal member 72. Similarly a third valve seat ring 85 is positioned within main valve chamber 80 and adapted to receive third seal member 74. A fourth valve seat ring 86 is further provided in main valve chamber 80 and is adapted to sealingly engage fourth seal member 76. A second valve piston cylinder 88 oppositely positioned from first valve piston cylinder 82 is adapted to slidingly receive second main piston 78. A connecting passage 90 provides a fluid flow path between main fluid passageway 62 and main valve chamber 80. In several embodiments, main fluid passageway 62 is substantially parallel to main valve chamber 80 and within the structure of main valve body 14 is fluidly connected to main valve chamber 80 only via connecting passage 90.

Main valve body 14 further includes a first air inlet port 92, a first cylinder connection port 94, a second air inlet port 96, and a first cylinder bore 98 each of which in FIG. 3 are pressurized with air at the same pressure received from an air tank 99. Main valve member 65 in FIG. 3 is shown in a main valve closed position. The main valve closed position occurs when pressurized air from air tank 99 moves main valve member 65 in a main valve closing direction "A" until first main piston 68 reaches an edge face or piston receiving portion of first connecting member 22. In the valve closed position shown, a depressurized chamber portion 100 (shown as a cross-hatched area) is achieved when second seal member 72 sealingly engages second valve seat ring 84 and fourth seal member 76 sealingly engages fourth valve seat ring 86. In this position, a second cylinder connection port 102 is in fluid communication with an exhaust port 104 (which can be connected to air exhaust port 38 of base 12 shown in FIG. 1) depressurizing chamber portion 100. Also in the valve closed position, second main piston 78 is spatially separated within first cylinder bore 98 from a second piston engagement face 97 defined as an outer wall portion of second connecting member 30. An electrical connection bay 105 is also provided in main valve body 14 to receive a plurality of electrical wiring, connections, etc. (not shown) which are accessible by removal of access plate 32 and fasteners 34. Electrical connection bay 105 can be isolated from any of the pressure containing sections of main valve body 14.

Valve assembly 10 also includes a pilot valve assembly 106. Pilot valve assembly 106 includes a pilot valve member 107 slidably disposed in pilot valve body 40. Pilot valve member 107 is slidable in each of a pilot valve closing direction "C" and a pilot valve opening direction "D". When main valve member 65 is to be positioned in the valve open position shown, pilot valve member 107 is moved in the pilot valve open direction "C". Pilot valve member 107 includes a pilot cylindrical shaft 108 and is slidably disposed in a pilot valve chamber 109. Pilot valve member 107 further includes a first pilot piston 110 at a first end followed successively by each of a first pilot seal ring 112, a second pilot seal ring 114, and a second pilot piston 116. Second pilot piston 116 is positioned at a second, opposite end of pilot cylindrical shaft 108 from first pilot piston 110. First pilot piston 110 is slidably received in a first pilot piston cylinder 118 created in pilot valve chamber 109.

First and second pilot seat rings 120, 122 extend inwardly from pilot valve body 40 into pilot valve chamber 109. First pilot seal ring 112 is positioned on pilot cylindrical shaft 108 to sealingly engage first pilot seat ring 120. Similarly, second pilot seal ring 114 is positioned on pilot cylindrical shaft 108 to sealingly engage second pilot seat ring 122. First and second pilot seal rings 112, 114 are created similar to each of first, second, third, and fourth seal members 70, 72, 74, 76 of main valve member 65 and therefore further include a resilient material seal 79. The size of pilot valve member 107 can be substantially equal to or can be different from the size of main valve member 65. In the example shown in FIG. 3, pilot valve member 107 is smaller both in length and in diameter compared to main valve member 65. Each of the first and second pilot seat rings 120, 122 are created similar to the seat rings of main valve body 14. A second pilot piston cylinder 124 is also created in pilot valve chamber 109 to slidingly receive second pilot piston 116.

Common flow passages are provided between main valve body 14 and pilot valve assembly 106 for example using a common solenoid passageway 126 created in second connecting member 30. Common solenoid passageway 126 is in fluid communication with main fluid passageway 62 of main valve body 14 and is further in fluid communication with each of second valve 28 and third valve 42. To reach the pilot valve open position shown in FIG. 3, pressurized air received via common solenoid passageway 126 is aligned through internal passageways (not shown) of third valve 42 and distributed from third valve 42 through a passageway 127 of second connecting member 30. Passageway 127 is aligned with a first pilot passageway 128 of pilot valve body 40. First pilot passageway 128 is in fluid communication with a first pilot bore 130 defined by first pilot piston cylinder 118.

To position main valve member 65 and pilot valve member 107 in each of the valve closed and pilot valve open positions shown, third solenoid 26 is energized while each of first and second solenoids 18, 24 remain de-energized. When third solenoid 26 is energized, an internal flow path of third valve 42 aligns common solenoid passageway 126 with passageway 127 and first pilot passageway 128. Pressurized air flows from common solenoid passageway 126 into first pilot bore 130 which contacts first pilot piston 110 and displaces pilot valve member 107 in the pilot valve open direction "C". Air between second pilot seal ring 114 and second pilot piston 116 is isolated between second pilot seat ring 122 and second pilot piston cylinder 124. In the pilot valve closed position shown, a pilot exhaust port 132 exhausts or vents the air between second pilot seal ring 114 and second pilot piston 116.

In the pilot valve open position pressurized air is present in a pilot chamber inlet passage 134 which is connected with common solenoid passageway 126. Pilot chamber inlet passage 134 opens into a first pilot sub-chamber 136. First pilot sub-chamber 136 is separated from a second pilot sub-chamber 138 by first pilot seat ring 120. In the pilot valve open position first pilot seal ring 112 is not engaged with first pilot seat ring 120, therefore pressurized air flows into each of first and second pilot sub-chambers 136 and 138. Pressurized air in second pilot sub-chamber 138 is in direct communication via a pilot chamber-to-main-valve cross connect 140 with first cylinder bore 98 of main valve body 14 which is operable to displace main valve member 65 in the main valve closing direction "A". To enable pilot valve member 107 to move in pilot valve open direction "C", air which is in second pilot piston cylinder 124 (below second pilot piston 116 as viewed in FIG. 3) is vented or discharged through a second pilot passageway 142 of pilot valve body 40 and through an exhaust port 143 of second valve 28. Third solenoid 26 is timed to de-energize when second pilot piston 116 reaches a closed end of second pilot piston cylinder 124. After third solenoid 26 de-energizes and valve 42 closes, air pressure from air tank 99 acting on main valve member 65 and pilot valve member 107 is retains main valve member 65 and pilot valve member 107 in their closed positions.

Figure 4:
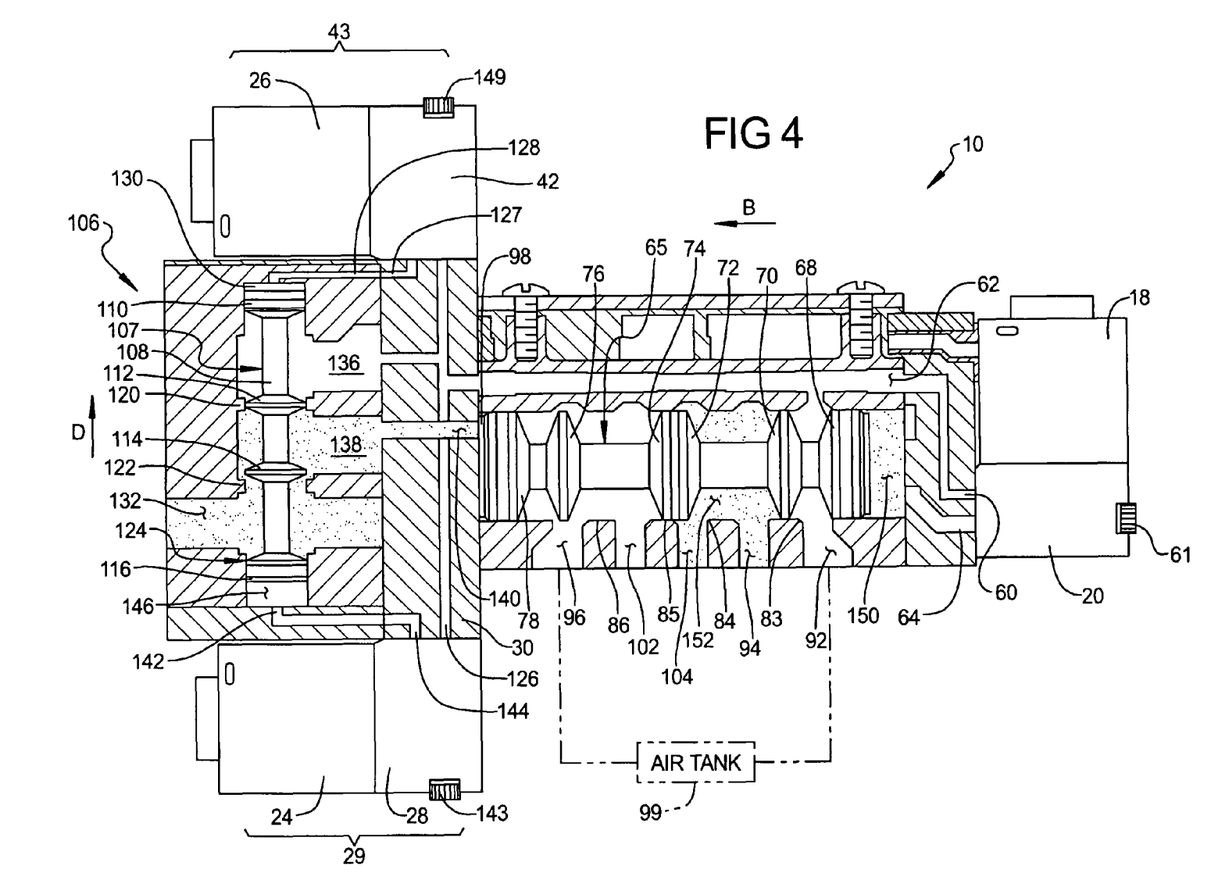
FIG. 4 is the partial cross-sectional view of the valve assembly with dual actuation solenoids of FIG. 3, showing the valve assembly repositioned in an open configuration.

Referring now to FIG. 4, a valve open position for main valve body 14 and a pilot valve closed position for pilot valve assembly 106 are shown. To reposition valve assembly 10 from the closed positions shown in FIG. 3 to the open positions shown in FIG. 4, each of the first and second solenoids 18, 24 are substantially simultaneously energized while third solenoid 26 remains de-energized. When second solenoid 24 is energized, pressurized air in common solenoid passageway 126 is aligned using internal passageways (not shown) of second valve 28 with a second cylinder bore 144 of second connecting member 30 which allows pressurized air to flow via second pilot passageway 142 into a second pilot bore 146 defined as a portion of second pilot piston cylinder 124. The pressurized air in second pilot bore 146 contacts second pilot piston 116 and displaces pilot valve member 107 in the pilot valve closed direction "D". Pilot valve member 107 slides longitudinally (in a vertically upward direction as viewed in FIG. 4) until first pilot piston 110 contacts an end face of first pilot bore 130.

In the pilot valve closed position second pilot seal ring 114 is disengaged from second pilot seat ring 122, and first pilot seal ring 112 sealingly engages first pilot seat ring 120. Second pilot sub-chamber 138 is thereafter isolated from first pilot sub-chamber 136 and air in second pilot sub-chamber 138 is vented along with air from first cylinder bore 98 through pilot-chamber-to-main-valve cross connect 140 out through pilot exhaust port 132. To permit pilot valve member 107 to displace in pilot valve closed direction "D", air previously in first pilot bore 130 is displaced through first pilot passageway 128 and a connecting member passageway 148 and through an internal passageway (not shown) of third valve 42 and through an exhaust port 149 of third valve 42.

At the same time that second solenoid 24 is energized, first solenoid 18 is substantially simultaneously energized which aligns connecting passageway 60 with valve member flow passage 64 through an internal passageway (not shown) of first valve 20. This allows pressurized air in main fluid passageway 62 to enter a second main cylinder bore 150 defined by first valve piston cylinder 82 which contacts first main piston 68 and displaces main valve member 65 in the main valve opening direction "B".

When main valve member 65 has displaced in main valve opening direction "B" until second main piston 78 contacts second connecting member 30, first seal member 70 sealingly engages first valve seat ring 83 and third seal member 74 sealingly engages third valve seat ring 85. In the valve open position a depressurized chamber portion 152 is created between third seal member 74 and first seal member 70. Chamber portion 152 together with air from first cylinder connection port 94 vent through exhaust port 104. First and second solenoids 18, 24 are timed to de-energize when main valve member 65 and pilot valve member 107 reach their end points of travel. After the first and second solenoids 18, 24 de-energize and their respective valves 20, 28 close, air pressure from air tank 99 acting on main valve member 65 and pilot valve member 107 is balanced which retains main valve member 65 and pilot valve member 107 in their open positions until third solenoid 26 is energized to return valve assembly 10 to the valve closed positions.

Figure 5:
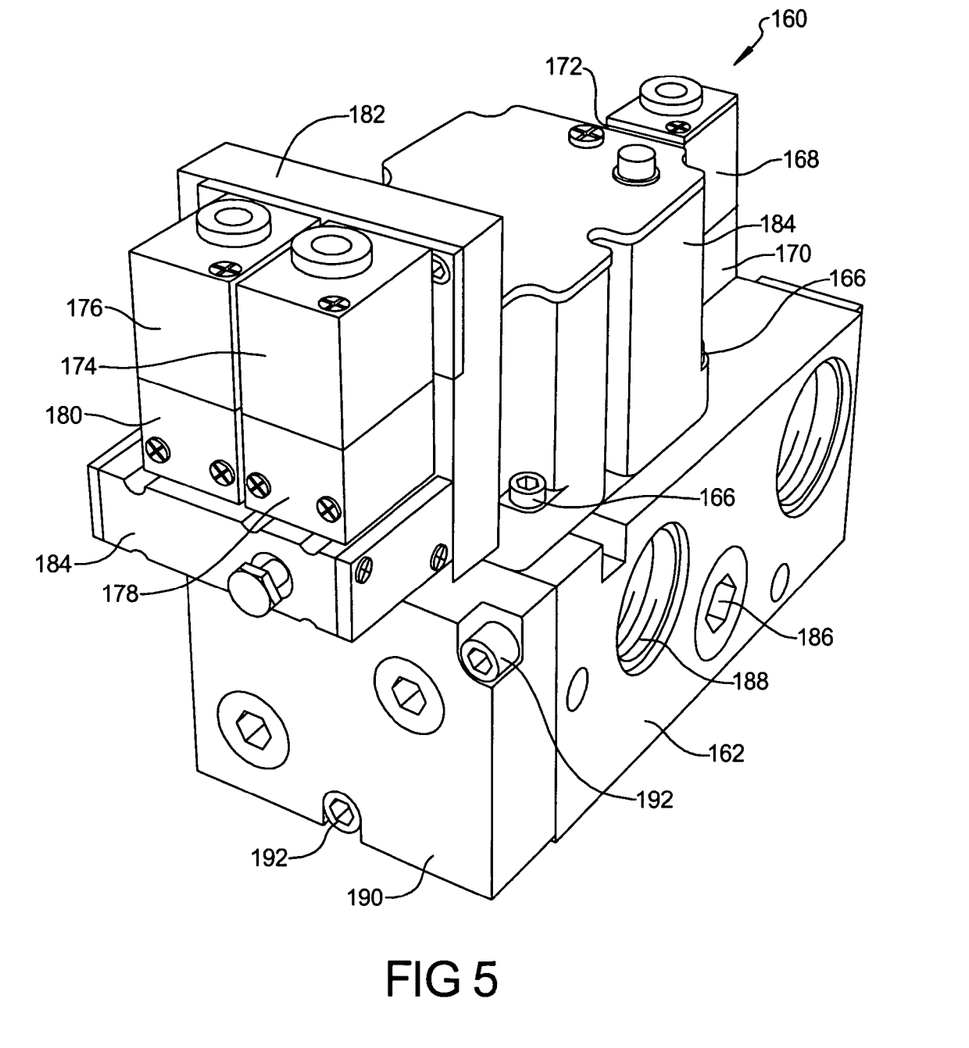
FIG. 5 is an end perspective view similar to FIG. 2 of another embodiment of the present disclosure.

Referring now generally to FIG. 5, in additional embodiments of the present disclosure a valve assembly 160 is modified from valve assembly 10 by re-orienting various components. Valve assembly 160 includes a base 162 having a main valve body 164 connected to the base 162 using a plurality of fasteners 166. A first solenoid 168 is connected to a first valve 170. First solenoid 168 and first valve 170 are collectively connected to a first connecting member 172 which is connected to main valve body 164. A second solenoid 174 and a third solenoid 176 are connected to each of a second valve 178 and a third valve 180 respectively. Second and third solenoids 174, 176 and second and third valves 178, 180 are collectively connected to a second connecting member 182 which is connected to main valve body 164. Each of the second and third valves 178, 180 are positioned above a pilot valve assembly 184. Pilot valve assembly 184 is in fluid communication with each of second and third valves 178, 180 and second connecting member 182. An air inlet port 186 and an air exhaust port 188 are also provided with base 162. An end cap 190 fastened to base 162 using a plurality of fasteners 192 is provided for access of the components within base 162. Valve assembly 160 provides pilot valve assembly 184 oriented horizontally in contrast to the substantially vertical configuration of pilot valve body 40 of FIG. 2.

Figure 6:
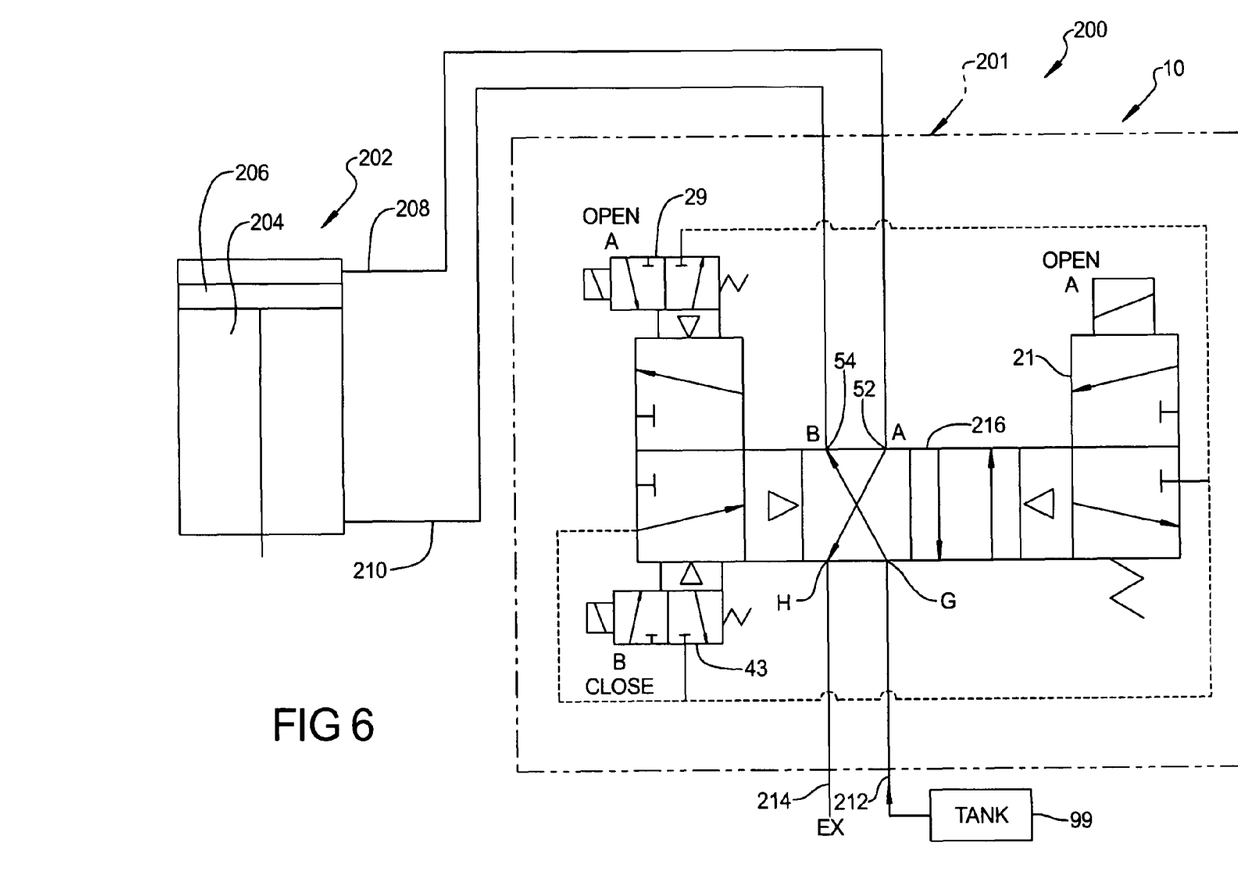
FIG. 6 is flow diagram of a system using double solenoids of the present disclosure which must be simultaneously energized to reposition a valve member to permit pneumatic fluid flow.

Referring now generally to FIG. 6, in several embodiments the solenoid and valve components defining valve assembly 10 define a valve fluid control system 200 but are not collectively connected to a valve body. Fluid control system 200 separates the solenoid and valve components of valve assembly 10 into a group of components 201 enclosed within the phantom lines, but separately connects the components using piping. This allows greater flexibility in configuring fluid control system 200 and eliminates base 12. The components are connected to an actuator cylinder 202 having a cylinder 204 and a piston 206. Each of a first actuator line 208 and a second actuator line 210 are connected to first cylinder port "A" and second cylinder port "B". In the valve closed position shown, first cylinder port "A" is cross-connected with an air exhaust port "H" and second cylinder port "B" is cross-connected with an air inlet port "G". Each of first, second and third solenoid operated valves 21, 29, 43 are in a de-energized state. An air inlet line 212 connects tank 99 to air inlet port "G" and air exhaust line 214 can be connected to air exhaust port "H" to discharge exhaust air from a valve member assembly 216 (functioning the same as main valve body 14 and pilot valve body 40). Similar to valve assembly 10, first and second solenoid operated valves 21, 29 are substantially simultaneously energized to move valve member assembly 216 to an open position, and only third solenoid operated valve 43 is energized to move valve member assembly 216 from the open to closed position.

According to several embodiments of the present disclosure first, second, and third valves 20, 28, and 42 are three-way valves, similar to three-way valves disclosed in U.S. Pat. No. 6,772,791 to Neff, issued on Aug. 10, 2004, the disclosure of which is incorporated herein by reference. The present disclosure however, is not limited to 3-way valves, and additional valve designs can be used within the scope of the present disclosure.

Valve assemblies and fluid control systems of the present disclosure are not limited to air applications. Other gasses, and other fluids such as hydraulic fluid can also be substituted for pressurized air within the scope of the present disclosure.

Valve assemblies of the present disclosure offer several advantages. By using each of a first solenoid operated valve to control a pilot valve and a second solenoid operated valve to control a main valve member and simultaneously energizing the first and second solenoid operated valves in order to displace the valve to an open position a second level of isolation is provided which prevents the valve from opening inadvertently. When the valve is in the normally open or the normally closed positions loss of pressurized air to the valve does not result in displacement of the valve from either the closed to the open or the open to the closed positions. In the valve closed position pressurized air is equalized across various elements of the main valve member and the pilot valve member tending to retain the main valve member and the pilot valve member in their fully closed positions. If either one of the first or second solenoid operated valves fails, valve assembly 10 will not automatically change from the valve closed to the valve open positions if a signal is received to the operating solenoid.

Manual solenoid actuation devices can also be provided which are substantially simultaneously actuated to direct the first and second solenoid operated valves to open the valve assembly. A single solenoid operated valve is provided to close the valve assemblies of the present disclosure. This simplifies the closure procedure because redundancy is not required to close the valves or to retain the valves in the closed position. Biasing devices previously used in the art for similar applications are not used in the valve assemblies of the present disclosure. Elimination of biasing assemblies as well as elimination of previously used magnets to retain the valve in a closed position provides positive pressure to retain the main valve member in the closed position without relying on a secondary magnet which is susceptible to acceleration loads displacing the magnet.

What is claimed is:
1. A solenoid actuated valve assembly, comprising:
 a valve body having a main valve member slidably disposed in the valve body, an exhaust port, a first cylinder connection port, and a second cylinder connection port;
 a pilot valve body in fluid communication with the valve body, the pilot valve body having a pilot valve member slidably disposed in the pilot valve body;
 a first solenoid operated valve operable when energized to permit a pressurized fluid to move the pilot valve member from a pilot valve open to a pilot valve closed position; and a second solenoid operated valve operable when simultaneously energized with the first solenoid operated valve to allow the fluid to move the main valve member from a valve closed to a valve open position;

wherein in the valve closed position the first cylinder port is in fluid communication with the exhaust port and in the valve open position the second cylinder port is in fluid communication with the exhaust port.

2. The valve assembly of claim 1, further comprising:

first and second piston cylinders created at opposite ends of the valve body; and first and second pistons of the main valve member each connected at opposite ends of a cylindrical shaft, the first piston slidably received within the first piston cylinder and the second piston slidably received within the second piston cylinder.

3. A solenoid actuated valve assembly, comprising:

a valve body having a main valve member slidably disposed in the valve body;

a pilot valve body in fluid communication with the valve body, the pilot valve body having a pilot valve member slidably disposed in the pilot valve body;

a first solenoid operated valve operable when energized to permit a pressurized fluid to move the pilot valve member from a pilot valve open to a pilot valve closed position;

a second solenoid operated valve operable when simultaneously energized with the first solenoid operated valve to allow the fluid to move the main valve member from a valve closed to a valve open position;

first and second piston cylinders created at opposite ends of the valve body;

first and second pistons of the main valve member each connected at opposite ends of a cylindrical shaft, the first piston slidably received within the first piston cylinder and the second piston slidably received within the second piston cylinder;

a main valve chamber of the valve body adapted to receive the main valve member; and a plurality of seat rings extending inwardly into the main valve chamber selectively engaged by the main valve member in the valve closed and the valve open positions.

4. The valve assembly of claim 3, wherein the plurality of seat rings comprises a first, a second, a third, and a fourth seat ring.

5. The valve assembly of claim 4, wherein the main valve member further comprises:

a plurality of seal members extending radially outwardly from the cylindrical shaft of the main valve member all positioned between the first and second pistons;

wherein the seal members individually include a resilient material defining a sealing perimeter adapted to contact individual ones of the seat rings.

6. The valve assembly of claim 5, wherein the plurality of seal members further comprises:

a first seal member sealingly engageable with the first seat ring in the valve open position;

a second seal member sealingly engageable with the second seat ring in the valve closed position;

a third seal member sealingly engageable with the third seat ring in the valve open position; and a fourth seal member sealingly engageable with the fourth seat ring in the valve closed position.

7. The valve assembly of claim 1, wherein each of the first and second solenoid operated valves comprises:

a solenoid portion; and a valve body portion having a plurality of valve body portion flow passages;

wherein the solenoid portion is connected to the valve body portion and the valve body portion is connected to the valve body.

8. The valve assembly of claim 7, further comprising:

a plurality of connecting members each fastenably connected to the valve body and adapted to fastenably receive one of the valve body portions of the first and second solenoid operated valves; and a plurality of flow passages created in individual ones of the plurality of connecting members, the flow passages alignable with individual ones of the plurality of valve body portion flow passages.

9. A solenoid actuated valve assembly, comprising:

a valve body having a main valve member slidably disposed in the valve body;

a pilot valve body in fluid communication with the valve body, the pilot valve body having a pilot valve member slidably disposed in the pilot valve body;

a first solenoid operated valve operable when energized to permit a pressurized fluid to move the pilot valve member from a pilot valve open to a pilot valve closed position;

a second solenoid operated valve operable when simultaneously energized with the first solenoid operated valve to allow the fluid to move the main valve member from a valve closed to a valve open position;

a third solenoid operated valve having a solenoid portion and a valve body portion connected to the valve body; and a plurality of flow passages created in the valve body portion alignable when the solenoid portion is energized to permit the fluid to move the pilot valve member to the pilot valve closed position and to move the main valve member to the valve open position.

10. The valve assembly of claim 9, wherein the first, second, and third solenoid operated valves comprise three-way valves.

11. A solenoid actuated valve assembly, comprising:

a valve body having a main valve member slidably disposed in the valve body;

a pilot valve body mechanically connected to and in fluid communication with the valve body, the pilot valve body having a pilot valve member slidably disposed in the pilot valve body;

a first solenoid operated valve connected to the pilot valve body operable when energized to permit a pressurized fluid to move the pilot valve member from a pilot valve open to a pilot valve closed position;

a second solenoid operated valve connected to the valve body operable when simultaneously energized with the first solenoid operated valve to allow the pressurized fluid to move the main valve member from a valve closed to a valve open position; and a third solenoid operated valve connected to the pilot valve body operable when energized and when both the first and second solenoid operated valves are de-energized to permit the pressurized fluid to move the pilot valve to the pilot valve closed position and the main valve member to the valve closed position.

12. The valve assembly of claim 11, further comprising:

a main valve chamber of the valve body adapted to receive the main valve member;

a pilot valve chamber of the valve body adapted to receive the pilot valve member; and a main fluid passageway created through the valve body substantially parallel to the main valve chamber and in communication with both the main and pilot valve chambers.

13. The valve assembly of claim 12, further comprising:
first and second main piston cylinders created at opposite ends of the main valve chamber; and
first and second main pistons of the main valve member each connected at opposite ends of a main cylindrical shaft, the first main piston slidably received within the first main piston cylinder and the second main piston slidably received within the second main piston cylinder.

14. The valve assembly of claim 13, further comprising:
first and second pilot piston cylinders created at opposite ends of the pilot valve chamber; and
first and second pilot pistons of the pilot valve member each connected at opposite ends of a pilot cylindrical shaft, the first pilot piston slidably received within the first pilot piston cylinder and the second pilot piston slidably received within the second pilot piston cylinder.

15. The valve assembly of claim 14, further comprising:
a first connecting member having a first flow passage aligned with the main fluid passageway and a second flow passage aligned with the main valve chamber; and
a second connecting member having a third flow passage aligned with the main fluid passageway, a fourth flow passage aligned with the first pilot cylinder, and a fifth flow passage aligned with the second pilot cylinder.

16. The valve assembly of claim 14, wherein each of the first, second, and third solenoid operated valves comprises:
a solenoid portion; and
a valve body portion connectably receiving the solenoid portion and having a plurality of valve body portion flow passages;
wherein the valve body portion of the first solenoid operated valve is connected to the second connecting member, the valve body portion of the second solenoid operated valve is connected to the first connecting member, and the valve body portion of the third solenoid operated valve is connected to the second connecting member.

17. The valve assembly of claim 11, wherein the first, second, and third solenoid operated valves comprise three-way valves.

18. A method for operating a solenoid actuated valve assembly, the valve assembly including a valve body having a main valve member slidably disposed in the valve body, a pilot valve body mechanically connected to and in fluid communication with the valve body, the pilot valve body having a pilot valve member slidably disposed in the pilot valve body, the method comprising:
energizing a first solenoid operated valve connected to the pilot valve body to direct a pressurized fluid to move the pilot valve member from a pilot valve open to a pilot valve closed position;
simultaneously energizing with the first solenoid operated valve a second solenoid operated valve connected to the valve body to direct the pressurized fluid to move the main valve member from a valve closed to a valve open position;
de-energizing both the first and second solenoid operated valves; and
energizing a third solenoid operated valve connected to the pilot valve body to direct the pressurized fluid to move the pilot valve to the pilot valve open position and the main valve member to the valve closed position.

* * * * *